United States Patent [19]

Weldy

[11] Patent Number: 5,020,120

[45] Date of Patent: May 28, 1991

[54] METHODS FOR REDUCING QUANTIZATION ERROR IN HIERARCHICAL DECOMPOSITION AND RECONSTRUCTION SCHEMES

[75] Inventor: John A. Weldy, Rochester, N.Y.

[73] Assignee: Eastman Kodak Company, Rochester, N.Y.

[21] Appl. No.: 455,107

[22] Filed: Dec. 22, 1989

[51] Int. Cl.⁵ ............................................. G06K 9/36
[52] U.S. Cl. ...................................................... 382/56
[58] Field of Search .................. 382/56; 358/428, 430, 358/445, 447, 467

[56] References Cited

U.S. PATENT DOCUMENTS

4,193,096  3/1980  Stoffel ................................ 358/430
4,682,869  7/1987  Itoh et al. ........................... 358/447
4,809,350  2/1989  Shimoni et al. ...................... 382/56
4,868,764  9/1989  Richards ............................. 382/56

Primary Examiner—Leo H. Boudreau
Assistant Examiner—David Fox
Attorney, Agent, or Firm—Edward Dugas

[57] ABSTRACT

Methods to reduce the quantization error in the higher spatial resolution digital image signals of a hierarchical decomposition and reconstruction scheme are disclosed. The quantization errors in the high spatial resolution digital image signals are reduced by modifying the low spatial resolution digital image signals in a way that can produce only small errors in the low spatial resolution digital image signal. The small errors in the low spatial resolution digital image signal are reduced by utilizing an improved reconstruction method.

16 Claims, 7 Drawing Sheets

N STAGE HIERARCHICAL DECOMPOSITION METHOD

NOTE: BOLD BOXES INDICATE IMAGES THAT ARE STORED, TRANSMITTED, FOR FUTURE USE

FIG. 1
N STAGE HIERARCHICAL DECOMPOSITION METHOD

NOTE: BOLD BOXES INDICATE IMAGES THAT ARE STORED, TRANSMITTED, FOR FUTURE USE

FIG. 4

| I | II | III | IV | V | VI | VII | VIII | IX | X | XI |
|---|---|---|---|---|---|---|---|---|---|---|
| HIGH RESOLUTION SIGNAL | DECOMPOSE I TO LOW RESOLUTION SIGNAL | PREDICT HIGH RESOLUTION FROM II | FORM RESIDUAL (I-III) | QUANTIZE RESIDUAL BY 2 | QUANTIZE ERROR IV-V | DECOMPOSE VI | NEW LOW RESOLUTION VII & II | PREDICT HIGH RESOLUTION FROM VIII | RECONSTRUCT HIGH RESOLUTION IX & V | ERROR X-I |
| 1 | 1 | 1 | 0 | 0 | 0 |   |   | 1 | 1 | 0 |
| 1 | 4 | 2 | -2 | -2 | 0 | 0 | 1 | 2 | 0 | 0 |
| 7 |   | 4 | 3 | 2 | -1 |   |   | 4 | 6 | -1 |
| 2 | 4 | 4 | -2 | -2 | 0 | 0 | 4 | 4 | 2 | 0 |
| 5 |   | 4 | 1 | 0 | 1 |   |   | 5 | 5 | 0 |
| 3 | 4 | 4 | -1 | -2 | 1 | 1 | 5 | 4 | 2 | -1 |
| 6 |   | 3 | 2 | 2 | 0 |   |   | 4 | 6 | 0 |
| 3 | 2 | 2 | 0 | 0 | 0 | 0 | 4 | 3 | 3 | 0 |
| 2 |   | 2 | 0 | 0 | 0 |   |   | 2 | 2 | 0 |
| 2 | 3 | 3 | -1 | 0 | -1 | -1 | 2 | 3 | 3 | 1 |
| 4 |   | 3 | 1 | 0 | 1 |   |   | 4 | 4 | 0 |
| 4 | 3 | 3 | 1 | 0 | 1 | 1 | 4 | 4 | 4 | 0 |
| 4 |   | 3 | 1 | 0 | 1 |   |   | 4 | 4 | 0 |
| 1 | 1 | 2 | -1 | 0 | -1 | 0 | 1 | 2 | 2 | 1 |
| 1 |   | 1 | 0 | 0 | 0 |   |   | 1 | 1 | 0 |
| 1 | 2 | 1 | 0 | 0 | 0 | 0 | 2 | 1 | 1 | 0 |
| 1 |   | 2 | -1 | 0 | -1 |   |   | 2 | 0 | -1 |
| 1 | 4 | 3 | -2 | -2 | 0 | 1 | 5 | 3 | 1 | 0 |
| 5 |   | 4 | 1 | 2 | -1 |   |   | 5 | 0 | -5 |
| 5 | 2 | 3 | 2 | 2 | 0 | 0 | 2 | 3 | 5 | 0 |
| 2 |   | 2 | 0 | 0 | 0 |   |   | 3 | 5 | 3 |
| 2 |   |   | 0 | 0 | 0 |   |   | 1 | 1 | -1 |

AVERAGE ABSOLUTE VALUE ERROR → .5 ← .3

MEAN SQUARED ERROR → .5 ← .3

NOTES: DECOMPOSE = LOW-PASS [1/4 1/2 1/4] ROUND DOWN AND SAMPLE DOWN

PREDICT = LINEAR INTERPOLATION

FIG. 7

QUANTIZATION ERRORS FROM PERFORMING METHODS SHOWN IN FIGURES 1, 2, 3, 5 AND 6

| | | DECOMPOSE METHOD OF FIGURE 1 | | DECOMPOSE METHOD OF FIGURE 3 | | DECOMPOSE METHOD OF FIGURE 5 (ITERATIVE METHOD) | |
|---|---|---|---|---|---|---|---|
| | | AVE | MSE | AVE | MSE | AVE | MSE |
| ROW NUMBER | COLUMN NUMBER → | I | II | III | IV | V | VI |
| A | HIGH RESOLUTION IMAGE RECONSTRUCTED BY METHOD OF FIGURE 2 | .49 | .70 | .39 | .63 | .33 | .58 |
| B | STORED LOW RESOLUTION IMAGE OF FIGURE 1, 3, OR 5 | 0 | 0 | .31 | .56 | .54 | .89 |
| C | LOW RESOLUTION IMAGE RECONSTRUCTED BY METHOD OF FIGURE 6 | 0 | 0 | .19 | .43 | .14 | .38 |

Row A header: RESIDUAL IMAGE QUANTIZED A FACTOR OF 2 MORE THAN LOW RESOLUTION IMAGE NOTES: IMAGE IS TWO-DIMENSIONAL UNIFORM RANDOM NUMBERS
AVE = AVERAGE ABSOLUTE VALUE ERROR   MSE = MEAN SQUARED ERROR
ITERATIVE METHOD 5 ITERATIONS WITH NO ADDITIONAL CONSTRAINT IN MODIFY STEP, BLOCK 49, FIGURE 5

METHODS FOR REDUCING QUANTIZATION ERROR IN HIERARCHICAL DECOMPOSITION AND RECONSTRUCTION SCHEMES

RELATED PATENT APPLICATIONS

This application is related to U.S. Patent Application:
Ser. No. 442,872 entitled "A HYBRID RESIDUAL-BASED HIERARCHICAL STORAGE AND DISPLAY METHOD FOR HIGH RESOLUTION DIGITAL IMAGES IN A MULTIUSE ENVIRONMENT", filed on Nov. 29, 1989;

Ser. No. 576,029 entitled "A HYBRID RESIDUAL-BASED HIERARCHICAL STORAGE AND DISPLAY METHOD FOR HIGH RESOLUTION DIGITAL IMAGES IN A MULTIUSE ENVIRONMENT", filed on Aug. 31, 1990, said application being a divisional application of Ser. No. 442,872, cited above.

Ser. No. 432,293 entitled "A HIERARCHICAL STORAGE AND DISPLAY METHOD FOR HIGH RESOLUTION DIGITAL IMAGES IN A MULTIUSE ENVIRONMENT", filed on Nov. 6, 1989; and Ser. No. 454,551 entitled "APPARATUS AND METHOD FOR QUANTIZING AND/OR RECONSTRUCTING MULTI-DIMENSIONAL DIGITAL IMAGE SIGNALS", filed on Dec. 21, 1989.

TECHNICAL FIELD OF THE INVENTION

The present invention is directed to the field of image processing and more particularly to reducing quantization errors in hierarchical decomposition and reconstruction methods for digital image signals.

BACKGROUND OF THE INVENTION

Many applications utilizing digital image signals employ a hierarchical decomposition scheme. An article by Burt and Adelson entitled "The Laplacian Pyramid as a Compact Image Code, "IEEE Trans. Commun., COM-31, 1983, p.p. 532-540 describes an encoding method wherein the original digital image signal is low pass filtered, and this low pass filtered digital image signal is decimated (subsampled) to take advantage of its reduced bandwidth. The decomposition process of low pass filtering and decimating is then repeated in successive steps to form a hierarchical structure or pyramid. The low spatial resolution digital image signals resulting from the low pass filtering and decimating steps, are interpolated and high spatial resolution residual digital image signals are formed to account for the incomplete reconstruction of a higher spatial resolution digital image signals from interpolated low spatial resolution digital image signals. Digital image signal data compression advantage can be realized as these residual digital image signals have reduced variance and may be more aggressively quantized.

As mentioned above, a hierarchical scheme might use a low spatial resolution digital image signal that is interpolated to form a high spatial resolution digital image signal and added to a high spatial resolution residual digital image signal that contains the high spatial resolution data not produced in the process of interpolating the low resolution digital image signal. Alternatively, subband or other decomposition schemes, and or combinations of schemes (such as using subbands for a middle resolution digital image signal and a residual for the highest resolution digital image signal) could also be implemented in a hierarchical manner.

Given limited resources for storing, transmitting, processing, or otherwise manipulating a digital image signal, it is desirable to compress the data load or size of these digital image signals. There are well known techniques for achieving image data compression that can include applying transformation techniques and/or quantizing (reducing the number of dynamic range levels) prior to coding the digital image signal for data compression. These techniques to achieve digital image signal data compression may be applied to any or all of the digital image signals resulting from a hierarchical decomposition. Typically, the higher spatial resolution components, whose higher spatial resolutions yield higher data loads, are aggressively compressed by quantizing and applying lossy compression techniques.

These techniques can also be applied to a multiuse environment. A multiuse hierarchical decomposition and reconstruction scheme permits fast access to low spatial resolution representations of these digital image signals. In addition, a multiuse featured hierarchical scheme then allows higher spatial resolution representations of these digital image signals to be reconstructed from these low spatial resolution digital image signals by appropriate image processing which includes adding, through the appropriate algorithm, the information necessary to achieve these higher spatial resolution digital image signals.

SUMMARY OF THE INVENTION

In one preferred method, digital image signals are hierarchically decomposed by performing the steps of:
(a) decomposing a quantized high spatial resolution digital image signal to form a low spatial resolution quantized digital image signal;
(b) predicting a high spatial resolution quantized digital image signal from the low spatial resolution quantized digital image signal of step (a);
(c) forming a high spatial resolution residual digital image signal by taking the difference between the predicted quantized high spatial resolution digital image signal of step (b) and the high spatial resolution digital image signal of step (a);
(d) reducing the number of quantization levels by quantizing the high spatial resolution residual digital image signal of step (c);
(e) forming a high resolution difference signal by taking the difference between said high resolution digital signal of step (c) and the reduced level high resolution residual digital image signal of step (d);
(f) decomposing the high spatial resolution difference digital image signal of step (e) to form a digital image signal with the same spatial resolution and number of quantization levels as the low spatial resolution digital image signal of step (a);
(g) combining the low spatial resolution digital image signal of step (a) and the low spatial resolution digital image signal of step (f) and
(h) storing and/or transmitting the combined low spatial resolution digital image signal of step (g) and the quantized high spatial resolution digital image of step (d) for future use.

From the foregoing, it can be seen that it is a primary object of the present invention to provide improved methods for decomposing a digital image signal in a hierarchical manner wherein the errors from quantizing the higher spatial resolution digital image signal components are reduced.

It is another object of the present invention to provide an improved method for reconstructing low resolution digital image signals that were formed from the above decomposition method.

The above and other objects of the present invention will become more apparent when taken in conjunction with the following description and drawings wherein like characters indicate like parts and which drawings form a part of the present description.

DETAILED DESCRIPTION OF THE PREFERRED EMBODIMENT OF THE INVENTION

A method for reducing the error in the higher spatial resolution digital image signals produced by hierarchical decomposition methods wherein the higher spatial resolution digital image signal components are more quantized than the lower spatial resolution digital image signal components is described. This method achieves lower quantization error in the higher spatial resolution digital image signals by modifying the digital image signal decomposition steps of a hierarchical decomposition method. The lower quantization error in the higher spatial resolution digital image signals is achieved by modifying the lower spatial resolution digital image signals. These modifications to the lower spatial resolution digital image signals do not, or can be constrained to not, impact the quality of the lower spatial resolution digital image signals.

The methods of the present invention are described as one-dimensional single channel digital image signals. The description of the technique is sufficient for those skilled in the art, to apply this technique to multichannel digital image signals (such as the red, green, and blue images in a color digital image signal) and to digital image signals with greater than one spatial dimension. The technique that follows could be applied in conjunction with other quantization schemes and other hierarchical decomposition schemes such as the types disclosed in the applications referenced under the heading RELATED PATENT APPLICATIONS.

A multiuse environment may require display of both high and low spatial resolution digital image signals. For example, a low spatial resolution digital image signal might be used for CRT viewing and a high spatial resolution digital image signal might be used for a high quality photographic image such as a transparency. Adding some error to the digital image signal for low dynamic range CRT viewing may not be as objectionable as having error in a high spatial resolution digital image signal recorded on a high dynamic range photographic transparency.

Figure 1:
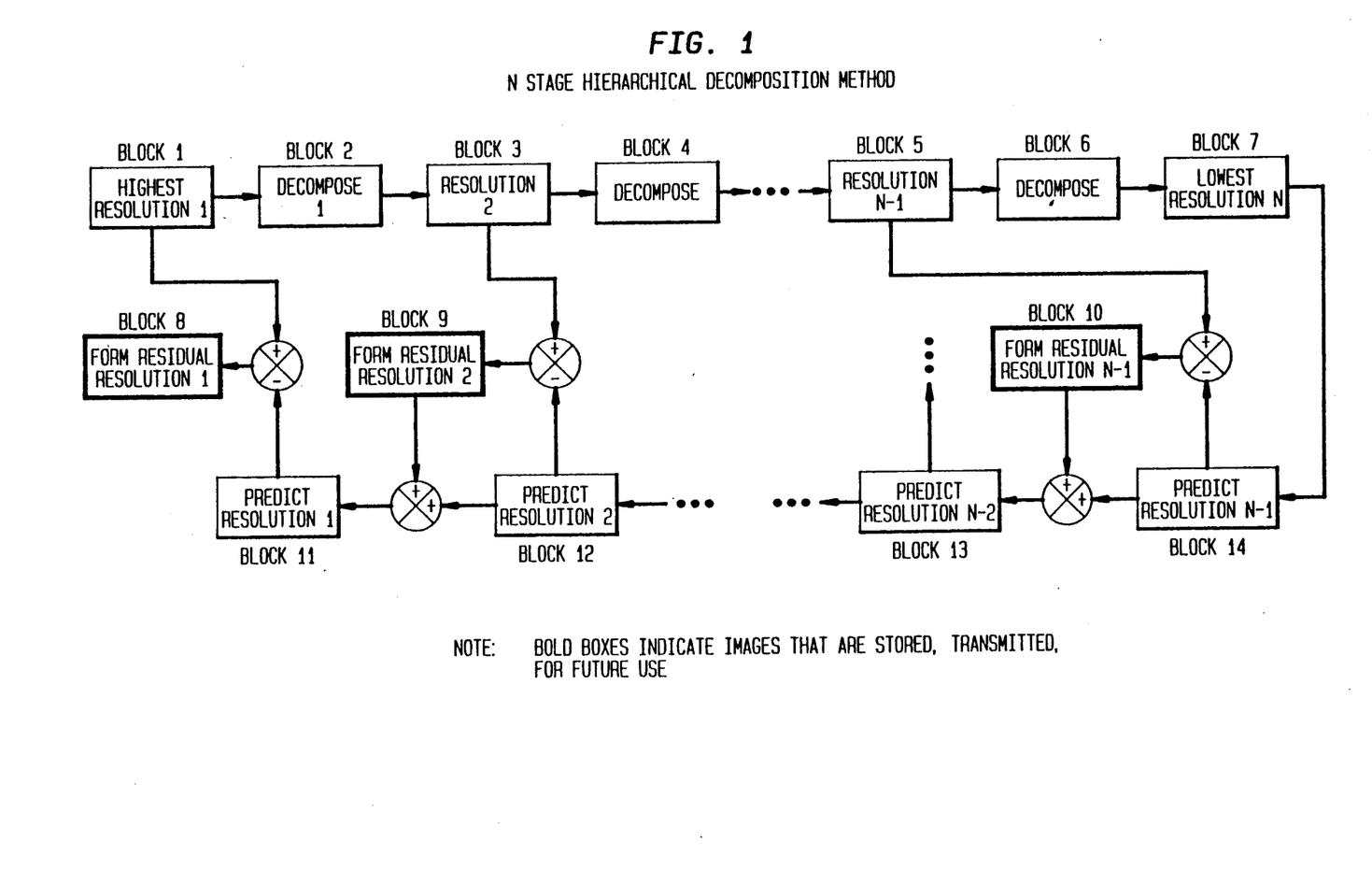
FIG. 1 is a process flow block diagram illustrating a hierarchical decomposition method.

A process flow block diagram of a residual hierarchical decomposition method with N spatial resolution stages is illustrated in FIG. 1. The highest spatial resolution digital image signal, Block 1, is decomposed in Block 2, to form a lower spatial resolution digital image signal, Block 3. The digital image signal in Block 3 is further decomposed to lower spatial resolution digital image signals by successive decomposition steps, Blocks 4 and 6, to form the lower spatial resolution digital image signals in Blocks 5 and 7. The lowest spatial resolution digital image signal, Block 7, is used to predict the next lowest spatial resolution digital image signal, Block 14, which is differenced with the actual digital image signal at that next lowest resolution, Block 5, to form a residual digital image signal, Block 10. The sum of the residual digital image signal in Block 10 and the predicted digital image signal in Block 14 are used to predict the next higher spatial resolution digital image signal in Block 13. The method is continued in a similar manner, wherein residual digital image signals in Blocks 8 and 9 are formed from predicted digital image signals in Blocks 12 and 13 respectively and differenced from the digital image signals in Blocks 1 and 3 respectively.

An example decomposition, for Blocks 2, 4, and 6, is to low pass filter and subsample the high spatial resolution digital image signal to a lower spatial resolution digital image signal. An example of the prediction step, for Blocks 11, 12, 13, and 14, would be to interpolate a lower spatial resolution digital image signal to a higher spatial resolution digital image signal.

Note that the digital image signals that are to be stored and/or transmitted appear in the bolded blocks in FIG. 1. The lowest spatial resolution digital image signal, Block 7 and the residual digital image signals, Blocks 8, 9, and, are stored and/or transmitted. Quantizing (reducing the number of dynamic range levels) these residual digital image signals is often performed to provide digital image signal data load reduction or compression to enhance data storage, transmission, etc.

Figure 2:
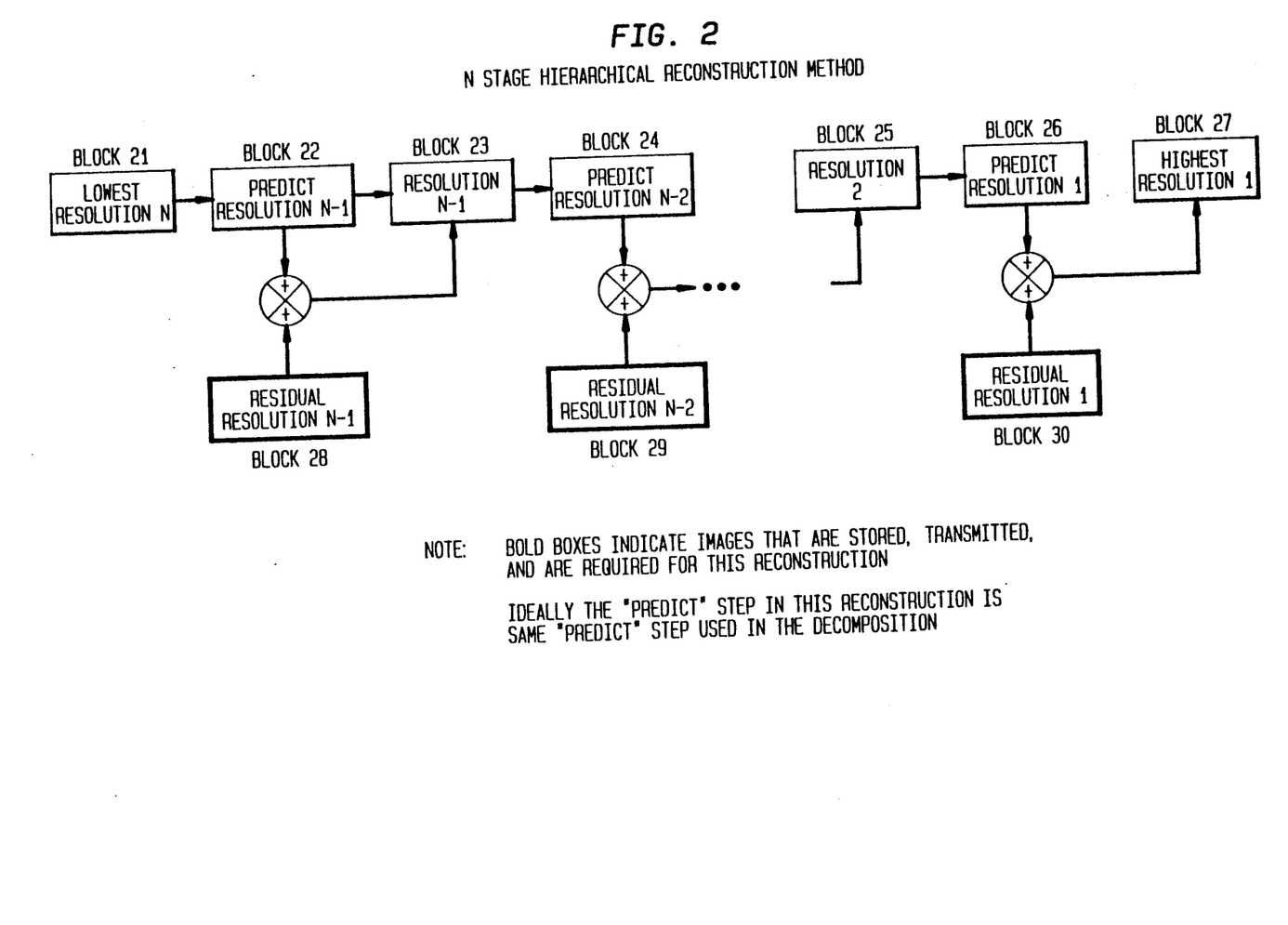
FIG. 2 is a process flow block diagram illustrating a hierarchical method for reconstructing digital image signals that were decomposed with a hierarchical method.

FIG. 2 is a process flow block diagram of the reconstruction method used to generate the higher spatial resolution digital image signals from the digital image signals that were stored and/or transmitted in the decomposition method illustrated in FIG. 1. A higher spatial resolution digital image signal, Block 22, is predicted from the lowest spatial resolution digital image signal, Block 21, and added to the residual digital image signal, Block 28, to form the next higher spatial resolution digital image signal, Block 23. The process of predicting, Blocks 24 and 26, and adding residual digital image signals, Blocks 29 and 30, is continued until the desired higher resolution digital image signal, Blocks 23, 25, and/or 27, has been reconstructed. Note that the best reconstruction is achieved when the same prediction procedure is used in both the decomposition and reconstruction methods.

Figure 3:
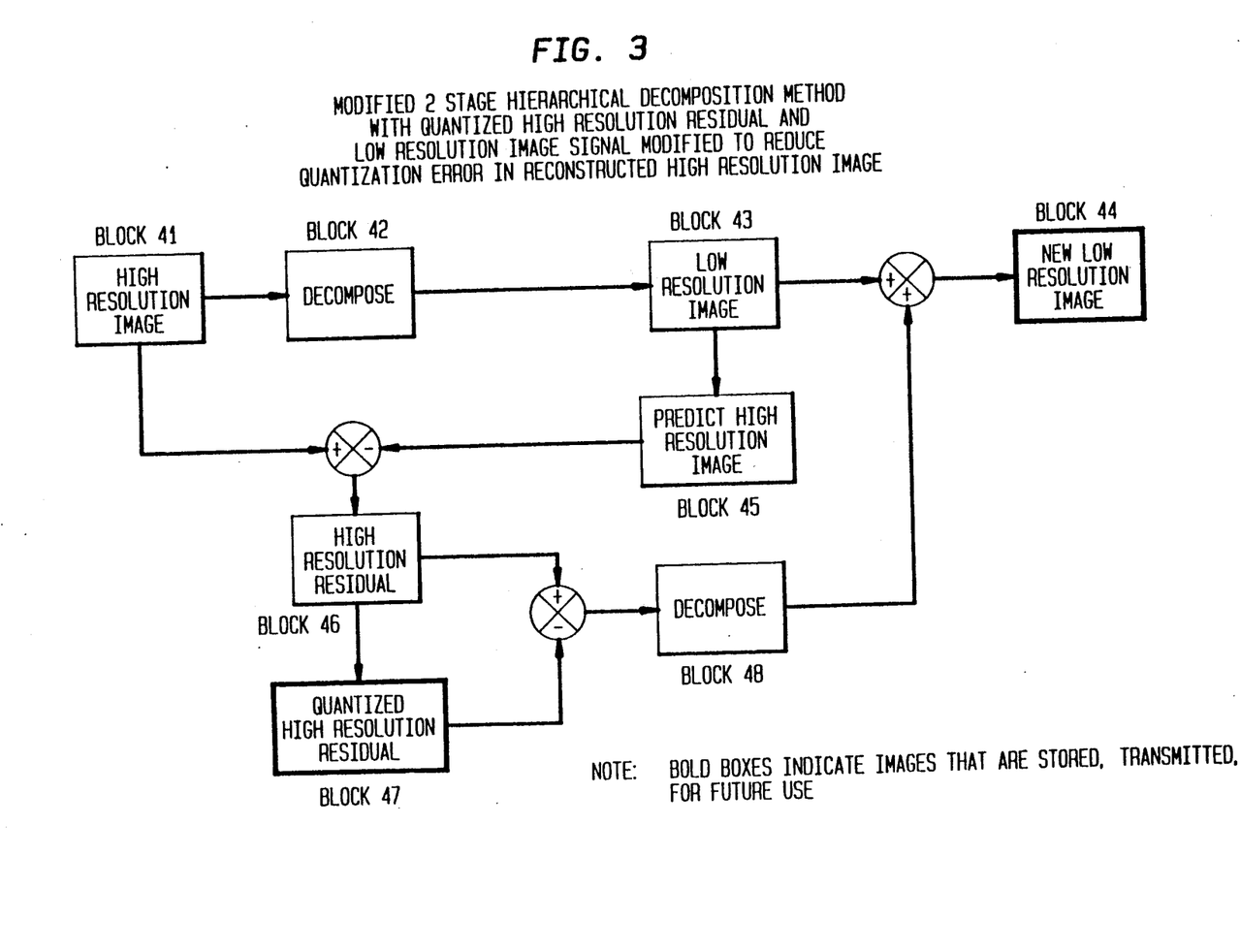
FIG. 3 is a process flow block diagram illustrating an improved hierarchical decomposition method.

The subject of the present invention is illustrated in FIG. 3 wherein additional steps are added to a two stage hierarchical decomposition method. Those skilled in the art should note that while the following description of the preferred method is illustrated with a two stage hierarchical decomposition method, the preferred method could be extended to hierarchical decomposition methods with more than two stages, particularly in applications wherein the higher spatial resolution digital image signal components are progressively more quantized.

Many of the steps in FIG. 3 are identical to those discussed in FIG. 1. The highest spatial resolution digital image signal, Block 41, is decomposed in Block 42, to form a lower spatial resolution digital image signal, Block 43. The low spatial resolution digital image signal in Block 43 is used to predict a high spatial resolution digital image signal in Block 45 that is differenced with the starting high spatial resolution digital image signal in Block 41 to form a high spatial resolution residual digital image signal, Block 46. To achieve image data load advantage, the high spatial resolution residual digital image signal in Block 46 is quantized, that is to say, the number of dynamic range levels is reduced, to form the quantized high spatial resolution residual digital image signal, Block 47. The high spatial resolution digital image signals in Blocks 46 and 47 are differenced and this high spatial resolution difference digital image signal is decomposed in Block 48 to form a low spatial resolution digital image signal that is added to the low spatial resolution digital image signal in Block 43 to form a modified low spatial resolution digital image signal in Block 44. The digital image signals in the bolded blocks, Blocks 47 and 44, are stored and/or transmitted for future use. Note that the method described in FIG. 1, which does not include the modification to the low spatial resolution digital image signal, would store and/or transmit Blocks 43 and 46 (or Block 47 if the number of quantization levels in the high spatial resolution residual digital image signal is reduced).

Note that in this improved method the high spatial resolution residual digital image signal is quantized to fewer levels than the low spatial resolution digital image signal. In many multistage systems, the higher spatial resolution residual digital image signals tend to be more severely quantized. This progressively more quantized approach would allow the above described technique to be applied in a cascaded hierarchical manner to a multistage system with more than two stages.

Further note that the decomposition procedure in Block 48 is preferably the same procedure used to decompose the high spatial resolution digital image signal in Block 42.

Also note that digital image signals that have been decomposed by the method of the present invention shown in FIG. 3 can be reconstructed with typical reconstruction methods such as the method described above and shown in FIG. 2.

Figure 4:
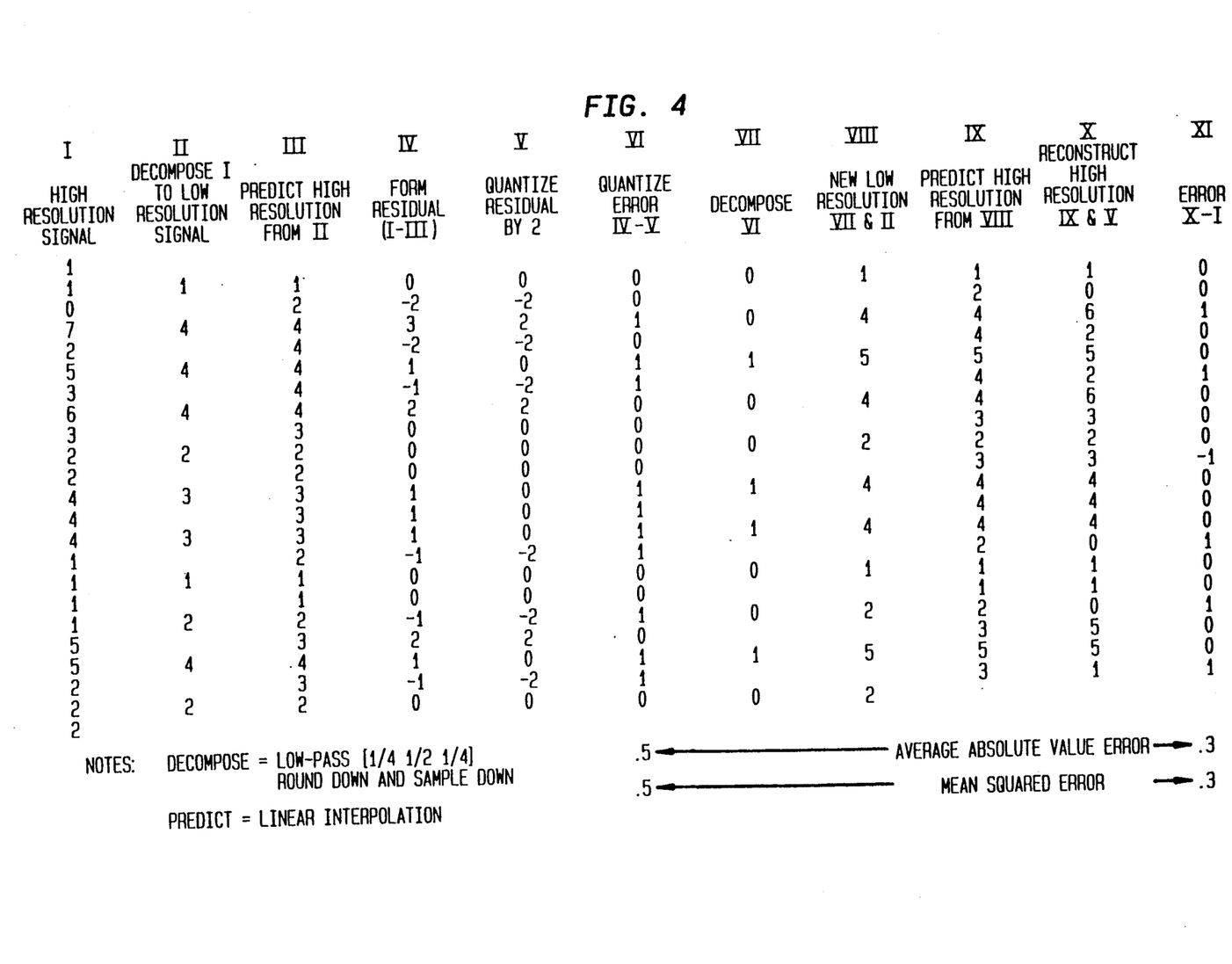
FIG. 4 is a table illustrating typical results of performing an improved hierarchical decomposition method.

The decomposition method in FIG. 3 and the reconstruction method in FIG. 2 were applied to the signal example in FIG. 4 which details each step of these methods. Column I corresponds to an original signal formed into a high spatial resolution multi-level quantized digital image signal. The formed high spatial resolution digital image signal from Column I is decomposed by low pass filtering and subsampling to form the low spatial resolution digital image signal in Column II. The decomposed low spatial resolution digital image signal in Column II is used to predict, by simple linear interpolation, the high spatial resolution digital image signal in Column III. The high spatial resolution digital image signal in Column III is differenced from the high spatial resolution digital image signal in Column I to form the high spatial resolution residual digital image signal in Column IV. The number of levels in the high spatial resolution residual digital image signal in Column IV is reduced by quantizing by a factor of two to form the quantized high spatial resolution residual digital image signal in Column V. The difference between Column IV and Column V forms the high spatial resolution difference digital image signal in Column VI. The high spatial resolution difference digital image signal from Column VI is decomposed, in the same manner as described for Column II, by low pass filtering and subsampling to form the low spatial resolution digital image signal in Column VII. The decomposed low spatial resolution digital image signal from Column VII is added to the decomposed low spatial resolution digital image signal from Column II to form a new low spatial resolution digital image in Column VIII. The digital image signals in Columns IV and VIII are the signals that are stored and/or transmitted for future use.

Future use of these stored digital image signals from Columns IV and VIII requires application of a reconstruction method such as that described above and shown in FIG. 2. Columns IX and X are examples of the application of such a reconstruction method and are also shown in FIG. 4. Column IX corresponds to a high spatial resolution digital image signal formed by predicting, by the same linear interpolation method used to create the high spatial resolution digital image signal in Column III, from the low spatial resolution digital image signal in Column VIII. The high spatial resolution digital image signals from Columns IX and V are combined to form the reconstructed high spatial resolution digital image signal in Column X. Column XI is the difference between the high spatial resolution digital image signal of Column X and the high spatial resolution digital image signal from Column I and is a measure of the error in the reconstructed high spatial resolution digital image signal, formed from the combination of the quantized high spatial resolution residual digital image signal and a high spatial resolution digital image signal predicted from the new low spatial resolution digital image signal that were stored and/or transmitted for this future reconstruction use.

Note that the error in reconstructing the high resolution digital image signal by the prior art method shown in FIG. 1 is represented by the high spatial resolution error digital image signal in Column VI and the error in reconstructing the high spatial resolution digital image signal by the subject of this invention is represented by the error high spatial resolution digital image signal in Column XI. Note that both the average absolute value and mean squared error have been reduced from 0.5 to 0.3 with the application of the method of the present invention.

Further note that the results from the low pass filtering operation used in the decomposition method to form the digital image signals in Columns II and VII were rounded down. This means that if the real number generated by the low pass filtering operation ends with "0.5", the nearest lower integer value is selected as the low pass filtered value. Rounding up does not, on the average, change the error in reconstructing the high spatial resolution digital image signal; however, since the quantization error in Column VI is always positive, rounding down will reduce the amount of modification, and therefore error, to the low spatial resolution digital image signal. Also note that alternate quantization methods that yield negative quantization error in Column VI, would produce fewer changes to, and therefore less error in, the low spatial resolution digital image signal when the real number generated by the low pass filtering operation is rounded up. Those skilled in the art should recognize, in general, the need to carefully consider the issues pertaining to the use of integer math in this type operations.

Those skilled in the art may recognize that the method of the present invention works because quantization error is white, that is uniform in frequency content, noise. By placing the low frequency components of this noise in the low spatial resolution digital image signal that has more quantization levels than the high spatial resolution digital image signal components, the error to the reconstructed high spatial resolution digital image signal is reduced.

In a further improvement to the above described method, an iterative method can be used to further reduce the quantization error in the reconstructed high spatial resolution digital image signals by performing additional, iterative modifications to the low spatial resolution digital image signal components.

Figure 5:
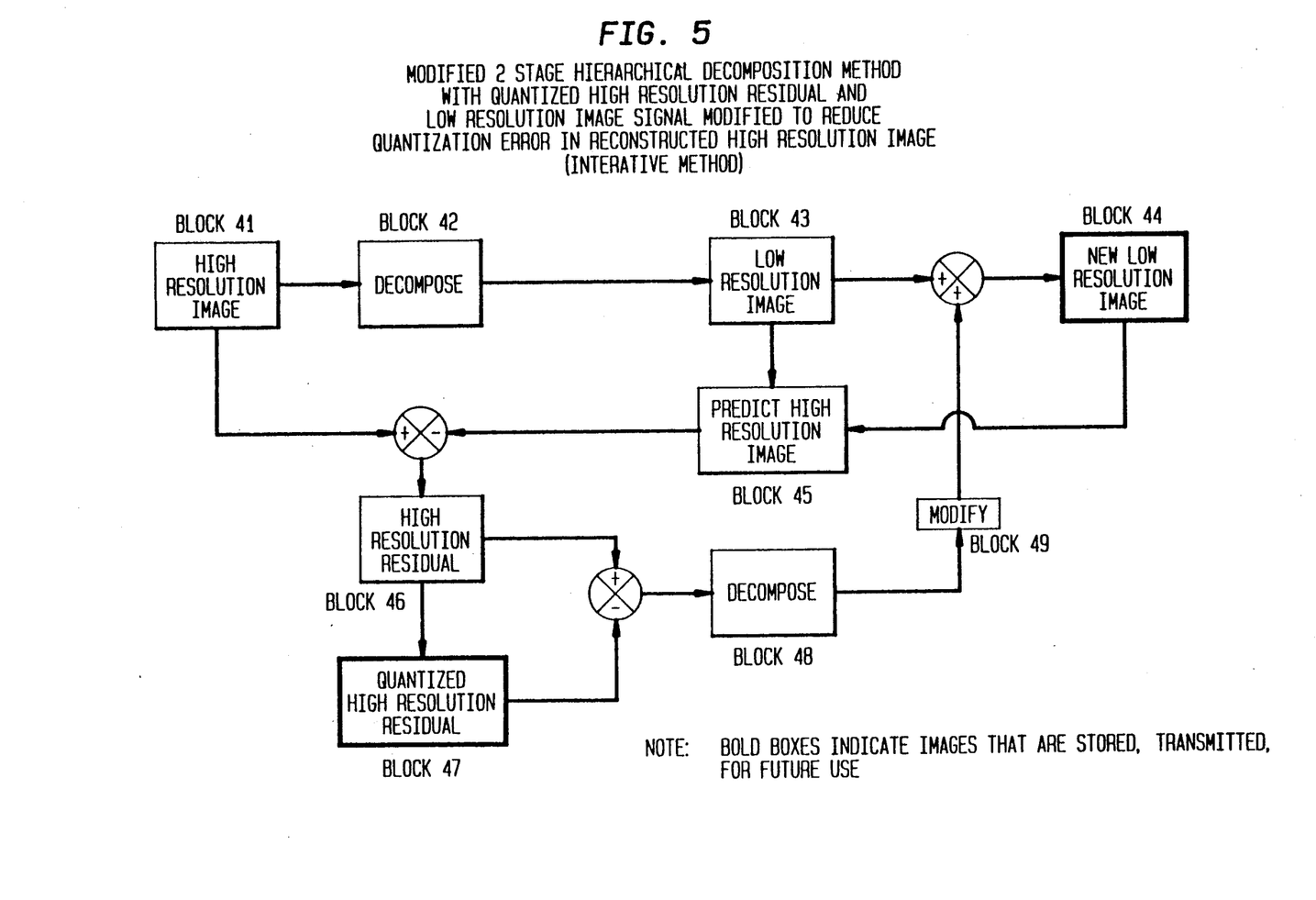
FIG. 5 is a process flow block diagram illustrating an improved iterative hierarchical decomposition method.

FIG. 5 is a process flow block diagram illustrating an iterative scheme to decompose a digital image signal. Note that many of the blocks in FIG. 5 are identical in number and function to those in FIG. 3. The additional process that yields a further reduction in the quantization error in the reconstructed high spatial resolution digital image signals is described below.

The initial pass through the process flow block diagram in FIG. 5 is identical to the above described process for FIG. 3. After the new low spatial resolution digital image signal is formed (for the first time) in Block 44, the error in the reconstructed high spatial resolution digital image signals is reduced by replicate application of the following process.

The new low spatial resolution digital image signal in Block 44 replaces the low resolution image of Block 43 as the input to the prediction process in Block 45 for all passes subsequent to the first, with modifications, by a modify signal from Block 49, being added for each pass to the previous low resolution image in Block 44 such that a high spatial resolution digital image signal is formed and subsequently differenced with the starting high spatial resolution digital image signal in Block 41 to form a high spatial resolution residual digital image signal in Block 46. To achieve image data load advantage, the high spatial resolution residual digital image signal in Block 46 is quantized, that is to say, the number of dynamic range levels is reduced, to form the quantized high spatial resolution residual digital image signal in Block 47. The high spatial resolution digital image signals in Blocks 46 and 47 are differenced and this high spatial resolution difference digital image signal is decomposed in Block 48 to form a low spatial resolution digital image signal that can be modified in Block 49, as will be described below, and then added to the low spatial resolution digital image signal in Block 43 to form yet another new low spatial resolution digital image signal in Block 44. This iterative process involving Blocks 44, 45, 46, 47, 48, and 49 can be repeated, if desired, until there is no further change to the low spatial resolution digital image formed in Block 44.

The modify step, Block 49 could consist of operations typically employed to constrain or limit a process where positive feedback resulting from the iterative process might cause an undesirable result. The modify step, Block 49, could include any or combinations of the following:

(1) Do nothing, just allow the process to iterate. The feedback nature of processes like this with no additional constraints can create a process that puts excessive error in the lower spatial resolution digital image signal.
(2) Constrain the modifications to the lower spatial resolution digital image signal to be progressively less with each iteration. For example, limit the maximum value of the absolute value of any modification to the lowest spatial resolution digital image signal to be a value of one less than the maximum value of the absolute value of any modification to the lowest spatial resolution digital image signal allowed for the previous iteration. The starting (for the first iteration through Block 49) maximum value, for example, could be related to the quantization factor or the ratio of quantization levels in the low spatial resolution digital image signal to the number of quantization levels in the higher spatial resolution residual digital image signal.
(3) For every iterative cycle, limit the modification to the low spatial resolution digital image signal to be specified values.
(4) Limit the number of iterations to a specified number of iterations.
(5) Limit the absolute value of the difference, at any sample location, between the modified low spatial resolution digital image signal, Block 44 and the original low spatial resolution digital image signal, Block 43 to some value.

The above operations that could be considered for the modification step in Block 49 are typical of the type of operation performed on iterative processes. Those skilled in the art will recognize that other similar operations could be included as whole or part of the modification step in Block 49.

The above described constraints to the operations in Block 49 are used to limit the error introduced into the low spatial resolution digital image signal from the iterative process used to reduce the error in reconstructed high spatial resolution digital image signal, formed from the combination of the quantized high spatial resolution residual digital image signal and a high spatial resolution digital image signal predicted from this new low spatial resolution digital image signal.

Figure 6:
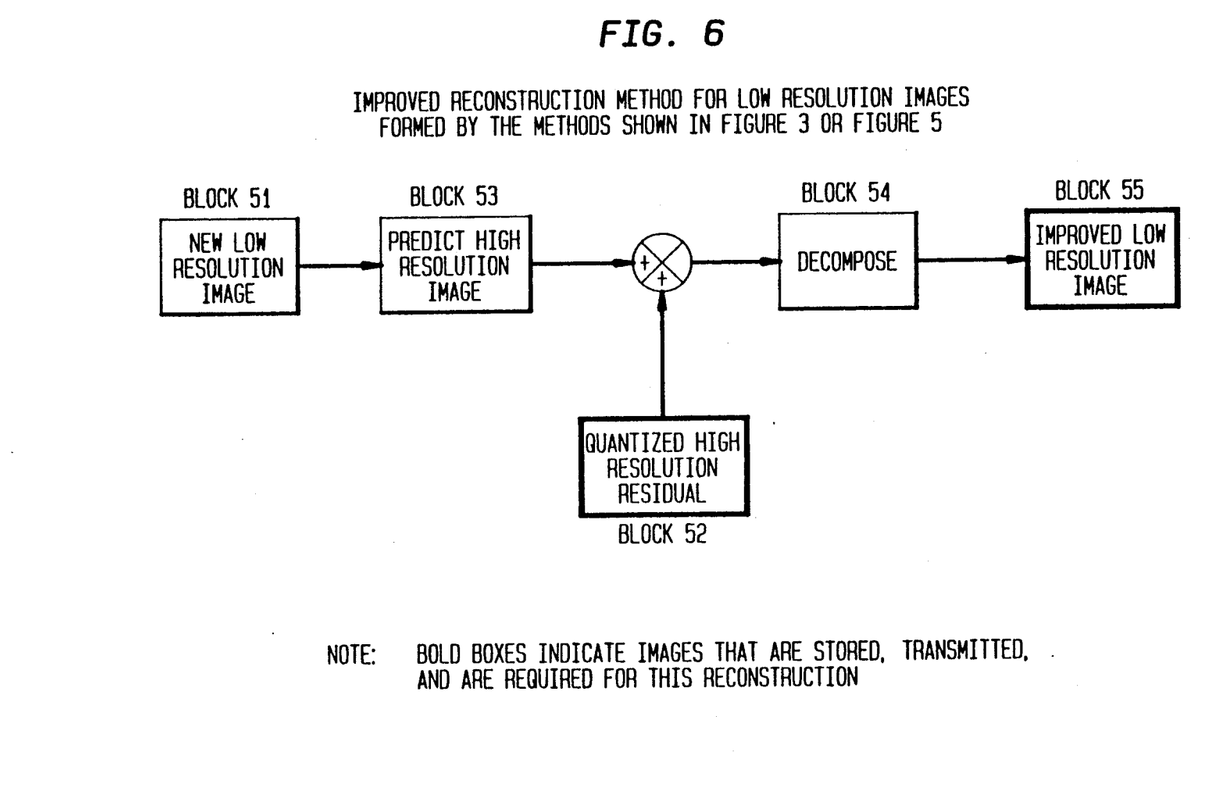
FIG. 6 is a process flow diagram illustrating an improved method for reconstructing low resolution digital image signals from the components formed from the improved hierarchical decomposition method.

The process flow block diagram in FIG. 6 shows how an improved low spatial resolution digital image signal can be reconstructed by utilizing higher spatial resolution digital image signal components in addition to the new low spatial resolution digital image signal. In other words, a low spatial resolution digital image signal which better approximates the low resolution image signal in Block 43 in FIGS. 3 and 5 can be reconstructed from the stored digital image signal components, such as the digital image signal components stored in Blocks 44 and 47 in FIGS. 3 and 5.

The process flow Block diagram in FIG. 6 illustrates a two stage hierarchical reconstruction method. Those skilled in the art should note that while the following description of this reconstruction method is illustrated for digital image signals that have been formed with a two stage hierarchical decomposition method, the following method could be extended to reconstruct digital image signals that have been formed from hierarchical decomposition methods with more than two stages, particularly in applications wherein the higher spatial resolution residual digital image signals are progressively more quantized.

Blocks 51 and 52 in FIG. 6 correspond to the digital images stored from a two stage hierarchical decomposition method, such as that shown in FIG. 5. In particular, Block 51 corresponds to the low spatial resolution digital image signal that was stored in Block 44 in FIGS. 3 and 5. Similarly, Block 52 corresponds to the high spatial resolution digital image signal that was stored in Block 47 in FIGS. 3 and 5. The improved low spatial resolution digital image signal, Block 55 is formed by reconstructing the high spatial resolution digital image signal from the digital image signals, Blocks 51 and 52, stored after the decomposition process and decomposing this reconstructed high spatial resolution digital image signal, Block 54, to form an improved low spatial resolution digital image signal, Block 55. The high spatial resolution digital image signal, Block 54, is formed by predicting a high spatial resolution digital image signal, Block 53 from the low spatial resolution digital image signal, Block 51, and adding the high spatial resolution residual digital image signal, Block 52.

Those skilled in the art will recognize that the above described process to reconstruct an improved low spatial resolution digital image may not require that the entire high resolution digital image signal be reconstructed. Depending on the decomposition method chosen, only portions of the high spatial resolution digital image signal are needed to reconstruct the value at a given sample location of the low spatial resolution image.

Figure 7:
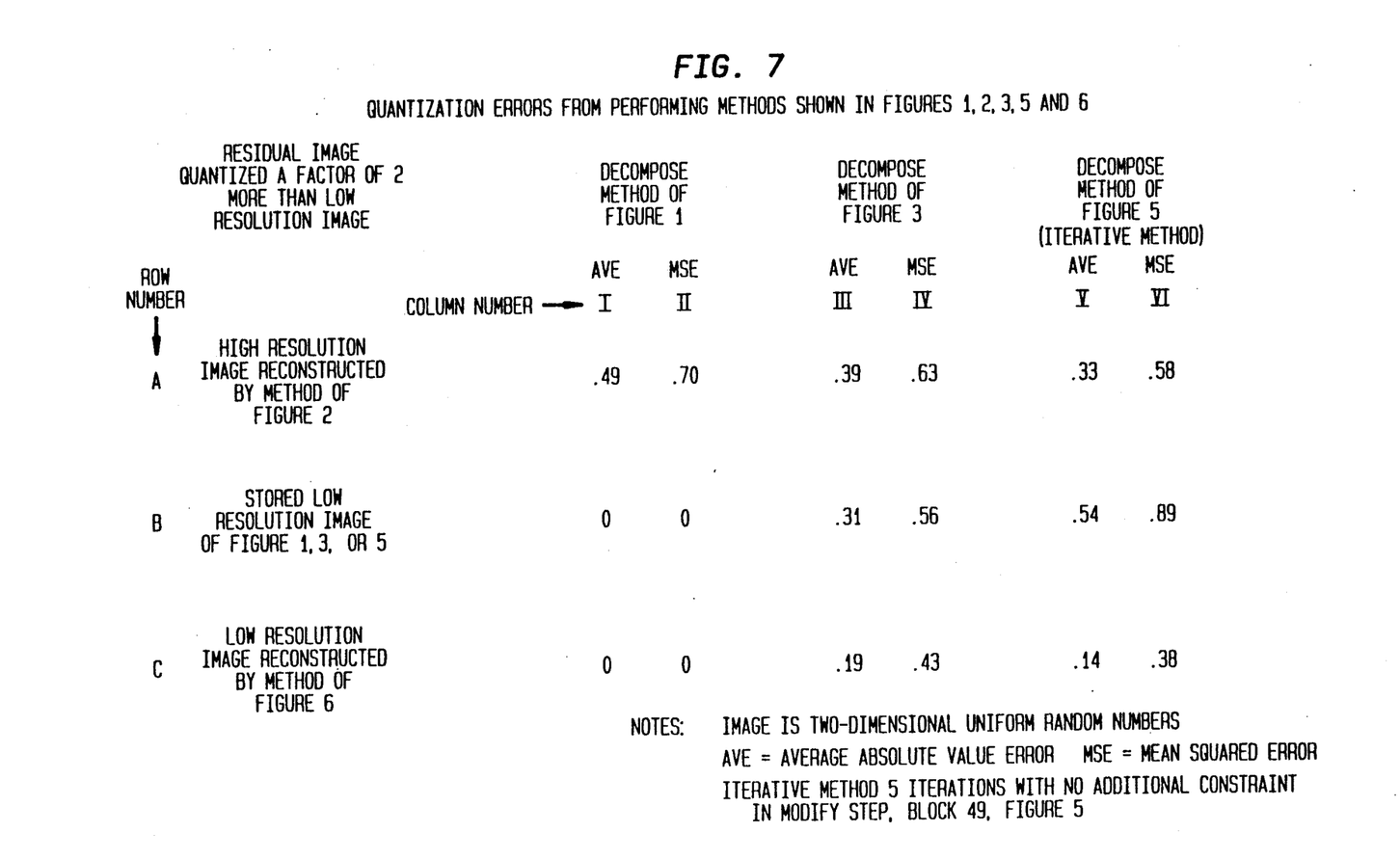
FIG. 7 is a table illustrating typical results of performing the methods shown in FIGS. 3, 5, and 6.

FIG. 7 is a table of results from the application of the above techniques to a two-dimensional uniform random number digital image signal. Errors from quantizing the high spatial resolution residual digital image signal by a factor of two are shown for the reconstructed low and high spatial resolution digital image signals that result from the decomposition methods shown in FIGS. 1, 3, and 5 and the reconstruction methods shown in FIGS. 2 and 6. Columns I and II show the average absolute value error and mean squared error respectively that result from the hierarchical decomposition method, illustrated in FIG. 1. Columns III and IV show the average absolute value error and mean squared error respectively that result from the iterative hierarchical decomposition method, illustrated in FIG. 3. Columns V and VI show the average absolute value error and mean squared error respectively that result from the hierarchical decomposition method, illustrated in FIG. 5. The errors listed in Columns V and VI result from a 5 pass iterative process with no constraints in the modify step, Block 49. Row A shows the quantization error that results in the high spatial resolution digital image signal reconstructed by the method shown in FIG. 2. Row B shows the error in the stored low spatial resolution digital image signal. Row C shows the quantization error that results in the low spatial resolution digital image signal reconstructed by the method shown in FIG. 6.

Note that the absolute value error in the high spatial resolution digital image signal is reduced from 0.49, in a method of the prior art, to 0.39 in a method of the present invention, and further reduced to 0.33 by another method of the present invention. This reduction in error in the high spatial resolution digital image signal is achieved at the expense of creating error in the low spatial resolution digital image signal stored after the decomposition process. The absolute value error in the low spatial resolution digital image signal is increased from 0, in a method of the prior art, to 0.31 in a method of the present invention, and further increased to 0.54 by another method of the present invention. However, by applying the low spatial resolution digital image signal reconstruction method of the present method invention, the absolute value error in a reconstructed low spatial resolution digital image signal is reduced from 0.31 to 0.19 for a digital image signal decomposed by the method shown in FIG. 3 and reduced from 0.54 to 0.14 for a digital image signal decomposed by the method shown in FIG. 5. Note that the low resolution digital image signal decomposition method shown in FIG. 5, yields errors that increase with the number of iterations (the results in Columns III and IV for the method shown in FIG. 3 are identical, by definition, to the results after the first pass through the iterative method shown in FIG. 5). However, while the errors in the stored low spatial resolution digital image signal increase, the errors in the low spatial digital image signal formed by the method shown in FIG. 6 decrease with the number of iterations in the method shown in FIG. 5.

While there has been shown what are considered to be the preferred embodiments of the invention, it will be manifest that many changes and modifications may be made therein without departing from the essential spirit of the invention. It is intended therefore, in the annexed claims, to cover all such changes and modifications as may fall within the true scope of the invention.

I claim:

1. A method for hierarchically decomposing digital images signals comprising the steps of:
   (a) decomposing a quantized high resolution digital image signal to form a low resolution quantized digital image signal;
   (b) predicting a high resolution quantized digital image signal from said low resolution quantized digital image signal of step (a);
   (c) forming a high resolution residual digital image signal by taking the difference between said predicted quantized high resolution digital image signal of step (b) and said high resolution digital image signal of step (a);
   (d) reducing the number of quantization levels by quantizing said high resolution residual digital image signal of step (c); (e) forming a high resolution difference signal by taking the difference between said high resolution residual digital image signal of step (c) and said reduced line high resolution residual digital image signal of step (d);
   (e) decomposing said high resolution difference digital image signal of step (e) to form a digital image signal with the same resolution and number of quantization levels as said low resolution digital image signal of step (a);
   (g) combining said low resolution digital image signal of step (a) and said low resolution digital image signal of step (f); and
   (h) storing and/or transmitting said combined low resolution digital image signal of step (g) and said quantized high resolution digital image of step (d) for future use.

2. The method according to claim 1, wherein step (a) is further comprised of the steps of:
   (I) low pass filtering said quantized high resolution digital image signal; and
   (II) subsampling said high resolution low pass filtered digital image signal of step (I) to form said low resolution digital image signal.

3. The method according to claim 2, wherein step (I) is further comprised of the steps of:
  (A) rounding down real number results of said low pass filtering in step (i) with a non integer component less than or equal to 0.5 to the next lower integer value; and
  (B) rounding up real number results of said low pass filtering in step (i) with a non integer component greater than 0.5 to the next higher integer value.

4. The method according to claim 1 where in step (b) is further comprised of the step of:
  (I) interpolating said low resolution digital image signal of step (a) to form said predicted higher resolution digital image signal.

5. The method according to claim 1, wherein step (f) is further comprised of the steps of:
  (I) low pass filtering said quantized high resolution digital image signal; and
  (II) subsampling said high resolution low pass filtered digital image signal of step (I) to form said low resolution digital image signal.

6. The method according to claim 5, wherein step (I) is further comprised of the steps of:
  (A) rounding down real number results of said low pass filtering in step (I) with a non integer component less than or equal to 0.5 to the next lower integer value; and
  (B) rounding up real number results of said low pass filtering in step (I) with a non integer component greater than 0.5 to the next higher integer value.

7. A method for hierarchically decomposing digital images signals comprising the steps of:
  (a) decomposing a quantized high resolution digital image signal to form a low resolution quantized digital image signal;
  (b) predicting a high resolution quantized digital image signal from said low resolution quantized digital image signal of step (a);
  (c) forming a high resolution residual digital image signal by taking the difference between said predicted quantized high resolution digital image signal of step (b) and said high resolution digital image signal of step (a);
  (d) reducing the number of quantization levels by quantizing said high resolution residual digital image signal of step (c);
  (e) forming a high resolution difference signal by taking the difference between said high resolution residual digital image signal of step (c) and said reduced level high resolution residual digital image signal of step (d);
  (f) decomposing said high resolution difference digital image signal of step (e) to form a digital image signal with the same resolution and number of quantization levels as said low resolution digital image signal of step (a);
  (g) combining said low resolution digital image signal of step (a) and said low resolution digital image signal of step (f) to form a new low resolution digital image signal;
  (h) predicting a high resolution quantized digital image signal from said new low resolution digital image signal of step (g);
  (i) forming a high resolution residual digital image signal by taking the difference between said predicted quantized high resolution digital image signal of step (h) and said high resolution digital image signal of step (a);
  (j) reducing the number of quantization levels by quantizing said high resolution residual digital image signal of step (i);
  (k) forming a high resolution difference signal by taking the difference between said high resolution residual digital image signal of step (i) and said reduced level high resolution residual digital image signal of step (j);
  (l) decomposing said high resolution difference digital image signal of step (k) to form a digital image signal with the same resolution and number of quantization levels as said low resolution digital image signal of step (a);
  (m) modifying said decomposed digital image signal of step (l),
  (n) combining said modified decomposed digital image signal of step (m) with the new low resolution digital image signal of step (g) to form a latest new low resolution digital image signal;
  (o) predicting a high resolution quantized digital image signal from said latest new low resolution quantized digital image signal of step (n);
  (p) iterating step (i) through (o) inclusive to further reduce error; and
  g and after completing the iteration of step (p) storing and/or transmitting latest new low resolution digital image signal of step (n) and said quantized high resolution digital image of step (i) for future use.

8. The method according to claim 7, wherein step (a) is further comprised of the steps of:
  (II) low pass filtering said quantized high resolution digital image signal; and
  (II) subsampling said high resolution digital image signal of step (I) to form said low resolution digital image signal.

9. The method according to claim 8, wherein step (I) is further comprised of the steps of:
  (A) rounding down real number results from said low pass filtering in step (i) with a non integer component less than or equal to 0.5 to the next lower integer value; and
  (B) rounding up real number results from said low pass filtering in step (i) with a non integer component greater than 0.5 to the next higher integer value.

10. The method according to claim 7 where in step (b) is further comprised of the step of:
  (I) interpolating said low resolution digital image signal of step (a) to form said predicted higher resolution digital image signal.

11. The method according to claim 10, wherein step (f) is further comprised of the steps of:
  (I) low pass filtering said quantized high resolution digital image signal; and
  (II) subsampling said high resolution digital image signal of step (I) to form said low resolution digital image signal.

12. The method according to claim 11, wherein step (I) is further comprised of the steps of:
  (A) rounding down real number results from said low pass filtering in step (I) with a non integer component less than or equal to 0.5 to the next lower integer value; and
  (B) rounding up real number results from said low pass filtering in step (I) with a non integer component greater than 0.5 to the next higher integer value.

13. The method according to claim 7, wherein step (m) is further comprised of the step of:

(I) performing no additional operation to said decomposed digital image signal of step (d).

14. The method according to claim 7, wherein step (m) is further comprised of the step of:

(I) constraining the modification to said decomposed digital image signal of step (l) with the nature of said constraint being related to the amount of quantization of step (d).

15. The method according to claim 7, wherein step (m) is further comprised of the step of:

(I) limiting the number of iterations of step (p).

16. A method for reconstructing low resolution digital image signals that reduces the errors in said low resolution digital image signals, that result from a decomposition method, claimed in claim 1 or claim 6, wherein said errors, that result from further quantizing of the high resolution digital image signal components, are reduced by performing steps that introduce error into said low resolution digital image signal.

* * * * *

UNITED STATES PATENT AND TRADEMARK OFFICE
CERTIFICATE OF CORRECTION

PATENT NO.  : 5,020,120
DATED       : May 28, 1991
INVENTOR(S) : John A. Weldy

It is certified that error appears in the above-identified patent and that said Letters Patent is hereby corrected as shown below:

Column 1, line 7, delete "Application" and insert -- Applications--.

Column 10, line 45, "(e)" should start a new paragraph.

Column 10, line 50, delete "(e)" and insert --(f)--.
Column 10, line 30, before "method" insert --machine implemented--.
Column 11, line 31, before "method" insert --machine implemented--.
Column 12, line 26, delete "g" and insert --(q)--.

Signed and Sealed this

Eighth Day of December, 1992

Attest:

DOUGLAS B. COMER

*Attesting Officer*     Acting Commissioner of Patents and Trademarks